United States Patent [19]

Adell

[11] Patent Number: 5,347,261
[45] Date of Patent: Sep. 13, 1994

[54] "HANDS FREE" VEHICLE BRIGHT LIGHT SIGNAL SYSTEM

[76] Inventor: Robert Adell, 31800 S. Brandingham, Franklin, Mich. 48025

[21] Appl. No.: 6,838

[22] Filed: Jan. 21, 1993

[51] Int. Cl.$^5$ .............................................. B60Q 1/26
[52] U.S. Cl. .................................... 340/469; 340/470; 340/471; 340/472; 307/10.8; 362/83.3
[58] Field of Search ...................... 340/469, 468, 457.2, 340/470, 472, 482, 471; 307/410.8; 362/83.3

[56] References Cited

U.S. PATENT DOCUMENTS

| | | | |
|---|---|---|---|
| 5,113,175 | 5/1992 | Adell | 340/468 |
| 5,119,067 | 6/1992 | Adell | 340/469 |
| 5,212,468 | 5/1993 | Adell | 340/469 |
| 5,237,306 | 8/1993 | Adell | 340/469 |

*Primary Examiner*—John K. Peng
*Assistant Examiner*—Nina Tong
*Attorney, Agent, or Firm*—Alex Rhodes

[57] ABSTRACT

A "hands free" vehicle signal system for requesting drivers to dim their vehicles' bright headlights. One front and two rear signal lights are mounted on the exterior of a vehicle and when activated flash "on" and "off" in high intensity patterns. "Hands free" operation of the signalling system is accomplished by a spoken word or automatically by front and rear mounted photocells. The front and rear signal lights can be operated individually or concurrently. In the first aspect of the invention, the front and rear signal lights transmit "on and off" beams of the same intensity. In a second aspect of the invention the front and rear signal lights transmit alternating patterns of high and low intensity flashing beams. In a first operating mode, the pair of rear signal lights alternately flash "on" and "off". In a second operating mode the pair of rear signal lights concurrently flash "on" and "off" to transmit a "thank you" message to a driver after he has dimmed his vehicle's bright headlights. The front and rear signal subsystems are automatically deactivated when either the vehicle's turn signal lights, brake lights or back-up lights become active.

22 Claims, 12 Drawing Sheets

"HANDS FREE" VEHICLE BRIGHT LIGHT SIGNAL SYSTEM

BACKGROUND OF THE INVENTION

This invention relates to automobile signal systems and more particularly to a "hands free" signal system for requesting drivers of vehicles moving in the same or opposite directions to dim their vehicles' bright headlights.

Passenger and commercial motor vehicles have headlights which transmit low intensity and high intensity beams. The low intensity beams are intended to be used for normal driving conditions and the high intensity beams are intended to be used only for short periods in special situations, by way of example, when driving through a sharp bend in a road at a high speed.

Drivers frequently forget to turn off their vehicles' high intensity headlight beams. This causes other drivers discomfort and irritation, particularly while driving on highways at high speeds. The high intensity headlight beams of a vehicle travelling behind another vehicle reflect off the inside rear view mirror and the exterior rear view mirrors of the forward vehicle and into a driver's eyes. A high intensity headlight beam of an oncoming vehicle may shine directly into a driver's eyes, creating a life threatening situation.

Although inside day/night rear view mirrors reduce the glare of bright headlights from behind a vehicle, they also have the undesirable effect of substantially reducing rear view vision. There are no provisions in a vehicle's exterior mounted mirrors for reducing glare from the headlights of vehicles which approach from the rear or for reducing glare from the bright headlights of oncoming vehicles.

"Hands free" vehicle systems are desirable, particularly at night, when controls are difficult to locate because vision is impaired.

SUMMARY OF THE INVENTION

The present invention is a "hands free" signal system for requesting drivers to dim vehicle bright lights. One feature of the invention is that front and rear signal subsystems can be activated by a spoken word or automatically by a bright light striking a photocell. Another feature of the invention is that it can be easily incorporated into existing vehicle designs. Another feature of the invention is that an optional "manual" operating mode is provided.

The front and rear subsystems can be operated individually or concurrently. In the first aspect of the invention, one front and two rear signal lights flash "on and off" to request drivers approaching from forward and rearward directions to dim bright headlights. The front signal light is incorporated with an external side mounted mirror and the two rear signal lights are incorporated into a vehicle's back-up lights.

In a second aspect of the invention the front and two rear signal lights transmit alternating high and low intensity light signals to request drivers to dim their vehicles' bright headlights. In both aspects of the invention, a two-second sequence of flashing light beams is transmitted at a frequency of 2 Hz to distinguish the signal lights from a vehicle's turn signal and emergency lights.

In the "voice" and "manual" operating modes, if a driver does not respond by dimming his vehicle's lights, the signalling system can be re-activated to transmit a second sequence initiated in the "manual" mode momentarily closing and releasing a manual switch and in the "voice" mode by a spoken word.

The rear signal lights have two operating modes. In the first mode, alternating signals from the rear signal lights request a driver of a vehicle approaching from the rear to dim his vehicle's bright lights. In the second operating mode, the rear lights concurrently flash in a short sequence to transmit a "thank you" message to a driver who has responded by dimming his vehicle's bright lights. The front and rear signal subsystems are deactivated by an abort circuit when either the vehicle's turn signals, brake signals or back-up signals are active.

The front signal subsystem is comprised of the front signal light, an interior indicator light, a front photocell, a threshold setting potentiometer and elements which are common with the rear signal subsystem, namely, an electronics module, a microphone, a mode operating switch and a manual switch.

The rear bright light signal subsystem is generally comprised of the pair of rear signal lights, a pair of interior indicator lights, a rear photocell, a threshold setting potentiometer and the elements which are common with the front bright light signal system, namely, the electronic module, microphone, mode operating switch and the manual switch.

In the automatic (photocell) operating mode, operation of the signalling subsystems will not occur unless light above a threshold level set by a driver strikes a photocell continuously for three seconds. The threshold set feature provides the benefit of providing a driver with control over the sensitivity of the automatic operating mode. The three-second delay feature prevents operation of the operating mode from short exposures of bright lights.

The rear signal subsystem has two operating modes. In the first mode, left and right signal lights alternately flash "on" and "off" to request a driver of a vehicle at the rear of the signalling vehicle to dim his vehicle's bright lights. In the second mode, the rear lights concurrently flash "on" and "off" to transmit a "thank you" message to a driver who responds by dimming his vehicle's bright lights. An abort circuit is provided which deactivates the signal system when either the turn signals, brake signals or back-up signals are activated.

In a second embodiment of the system a pair of low intensity and a pair of high intensity signal lights are mounted on the rear of a vehicle. The rear signal lights have two operating modes, namely, a first mode wherein the two low intensity rear lights concurrently flash "on" and "off" alternately with the high intensity rear lights which concurrently flash "on" and "off", and a second mode wherein only the pair of high intensity rear lights concurrently flash "on" and "off" to transmit the "thank you" message.

Further benefits, features and objects of the invention will be apparent from the ensuing description of the invention and accompanying drawings which describe the invention in detail. A preferred embodiment is disclosed in accordance with the best mode which is contemplated in practicing the invention, and the subject matter in which exclusive property rights are claimed is set forth in each of the numbered claims at the conclusion of the detailed description.

DESCRIPTION OF THE PREFERRED EMBODIMENT

Figure 1:
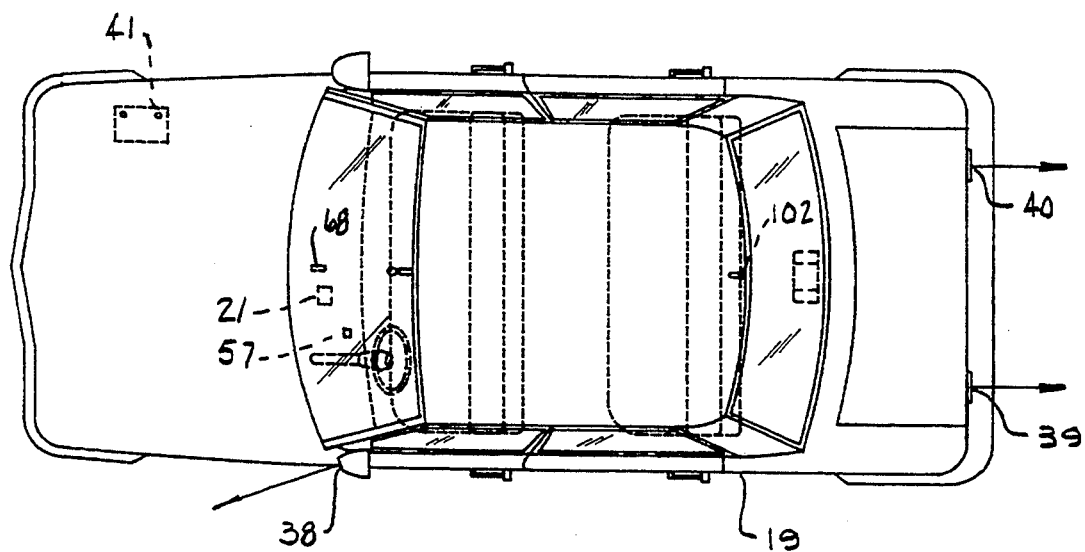
FIG. 1 is a plan view of a vehicle which is equipped with a bright light signalling system.
Figure 2:
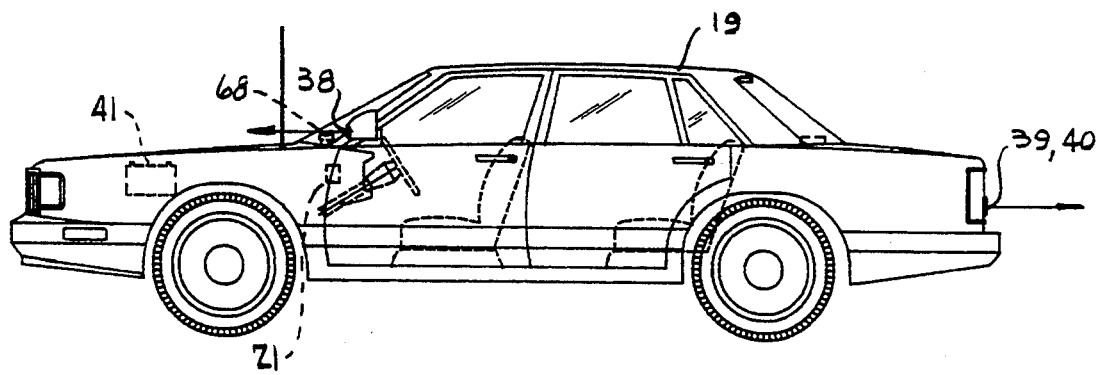
FIG. 2 is a side view of the vehicle of FIG. 1.
Figure 3:
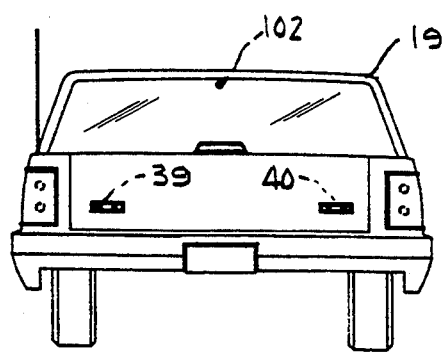
FIG. 3 is a rear view of the vehicle of FIG. 1.
Figure 4:
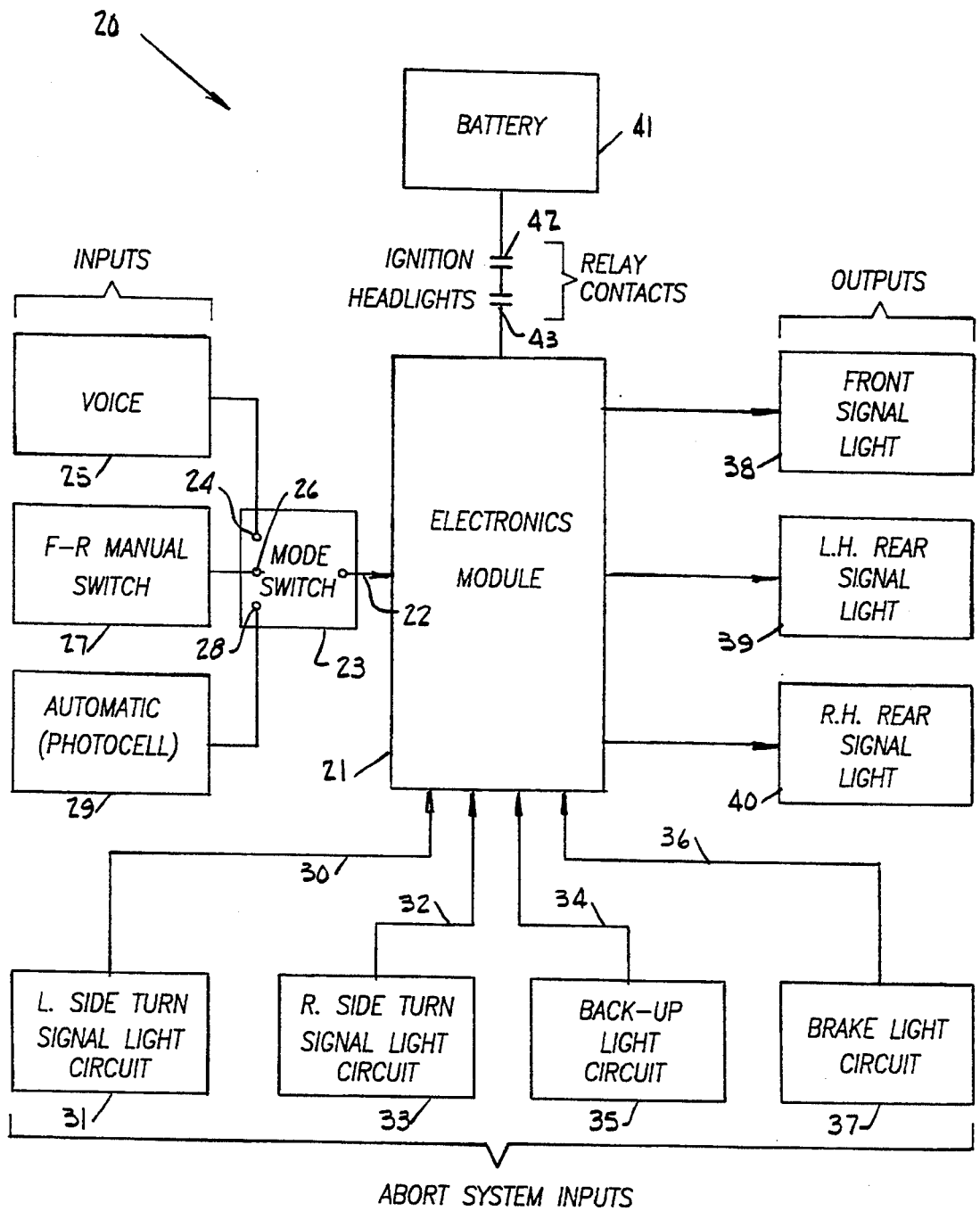
FIG. 4 is a block diagram of a first embodiment of the bright light signal system.

Referring now to the drawings wherein like numerals designate like and corresponding parts, a vehicle 19 with a "hands free" bright light signalling system 20 having front and rear subsystems for requesting a driver to dim his vehicle's bright lights is shown in FIGS. 1 through 4, inclusive. The signalling system has a digital electronics module 21 which receives an input 22 from a three position selector switch 23. The three positions, shown in FIG. 4, are a voice position 24, a "manual" position 26, and an "automatic" position 28. The voice position 24, "manual" position 26 and "automatic" position 28 are connected to a voice recognition circuit 25, "F-R" switch 27 and photocell circuit 29, respectively. The "manual" mode is an optional feature and in the "manual" operating mode the front and rear signalling subsystems are selected by a "manual" switch 27.

With reference to FIG. 4, the electronic module 21 also receives inputs from an abort system consisting of an input 30 from a left side turn signal circuit 31, an input 32 from a right side turn signal circuit 33, an input 34 from a back-up light circuit 35 and an input 36 from a brake light circuit 37. The turn signal circuits 31 and 33, back-up lamp circuit 35 and brake light circuit 37 are conventional. The abort system inputs 30, 32, 34, and 36 individually deactivate signalling system 20 regardless of the state of system 20 and keeps system 20 inactive during the times that the vehicle's turn signals, back-up lights or brake lights are operative.

The outputs of electronic module 21 activate a front signal light 38 mounted in a forward portion of the vehicle's exterior side view mirror and a left side rear signal light 39 and a right side rear signal light 40 mounted in the vehicle's back-up light housings at the rear of the vehicle 19. The vehicle's rear signal subsystem has two operating states. In the first operating state, the left side 39 and right side 40 high intensity rear signal lights flash alternately to request a driver of a vehicle approaching from the rear to dim his vehicle's bright lights. In the second operating state, the high intensity rear signal lights 39, 40 concurrently flash "on" and "off" to transmit a "thank you" message to a driver if he responds by dimming his vehicle's bright lights. The front signal light 38 has a single operating state wherein a single high intensity light 38 flashes "on" and "off".

Voltage is supplied to the electronic module 21 from the vehicle's battery 41 via a relay contact 42 energized by a conventional ignition circuit (not shown) in series with a contact 43 energized by a conventional headlight circuit (not shown) in either the vehicle's headlight high or low beam condition.

Figure 5:
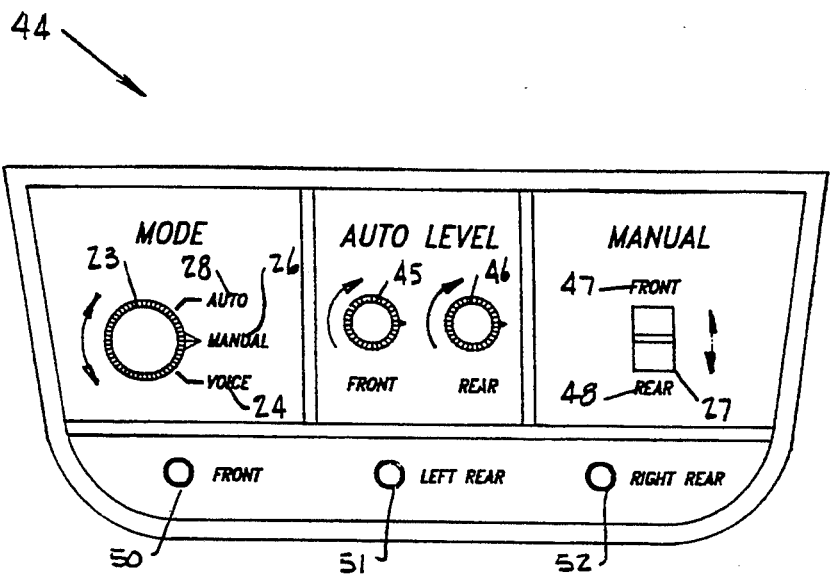
FIG. 5 is a front view of a control panel for operating the vehicle bright light signal system.

Referring now to FIG. 5, the operating controls for the signalling system 20 are mounted in a control panel 44 in the interior of the vehicle 19 and consist of the selector switch 23, potentiometers 45, 46 for adjusting the sensitivity levels of the automatic photocell operating mode, "F-R" manual switch 27 and three signal indicator lights 50, 51 and 52. The two potentiometers 45, 46 allow a driver in the automatic photocell mode 28 to set thresholds for activating the front signal light 38 to signal a car approaching from the front and the rear signal lights 39 and 40 to signal a car approaching from the rear.

The "F-R" manual switch 27 is a three-position spring loaded "center off" switch which activates the front and rear signal subsystems. It provides a ground in two positions in either the front 47 or rear 48 switch positions when the three-position mode selector switch 23 is in the "manual" 26 position. Activation of the front 38 or rear 39 and 40 signal lights requires that the switch 27 be momentarily closed in the front 47 or rear 48 positions and released to allow the switch to spring back to its center "off" position.

The three small indicator lights 50, 51, 52 shown in FIG. 5 inform the driver that his signal lights are operating. Indicator lights 50, 51, 52 flash concurrently with the front 38 and rear 39, 40 signal lights. For example, indicator light 50 labeled "FRONT" flashes when front signal light 38 is flashing. The same is true for the rear indicator lights 51, 52, i.e., indicator lights 51 and 52 alternately flash when rear signal lights 39, 40 are flashing.

Figure 6:
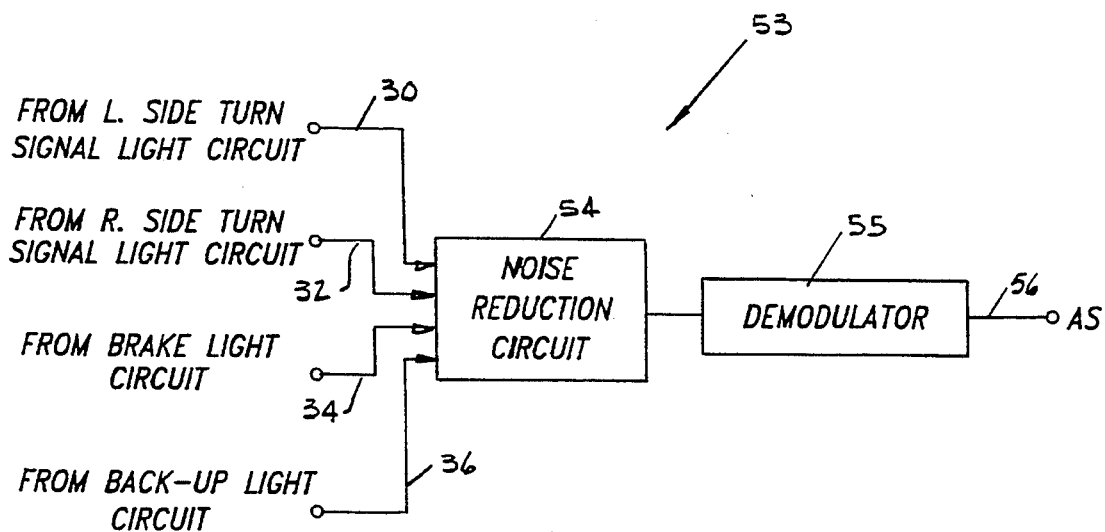
FIG. 6 is a block diagram of the abort subsystem of FIG. 4.

The abort system 53 is shown in FIG. 6. The left side 31 and right side 33 turn signal circuits, brake 35 and back-up light 37 circuits supply inputs 30, 32, 34, 36 to a noise reduction circuit 54. The noise reduction circuit 54 prevents electrical noise from interfering with the electronics. Noise reduction circuit 54 is coupled to a demodulator 55. The function of the demodulator 55 is to keep a line 56 designated AS (Abort Subsystem) high if either the turn signal circuits 31, 33; brake light circuit 35 or back-up light circuit 37 are energized. The demodulator 55 remains high even though the input from the noise reduction circuit 54 alternates between high and low when turn signal circuits 31, 33 are active.

Figure 7:
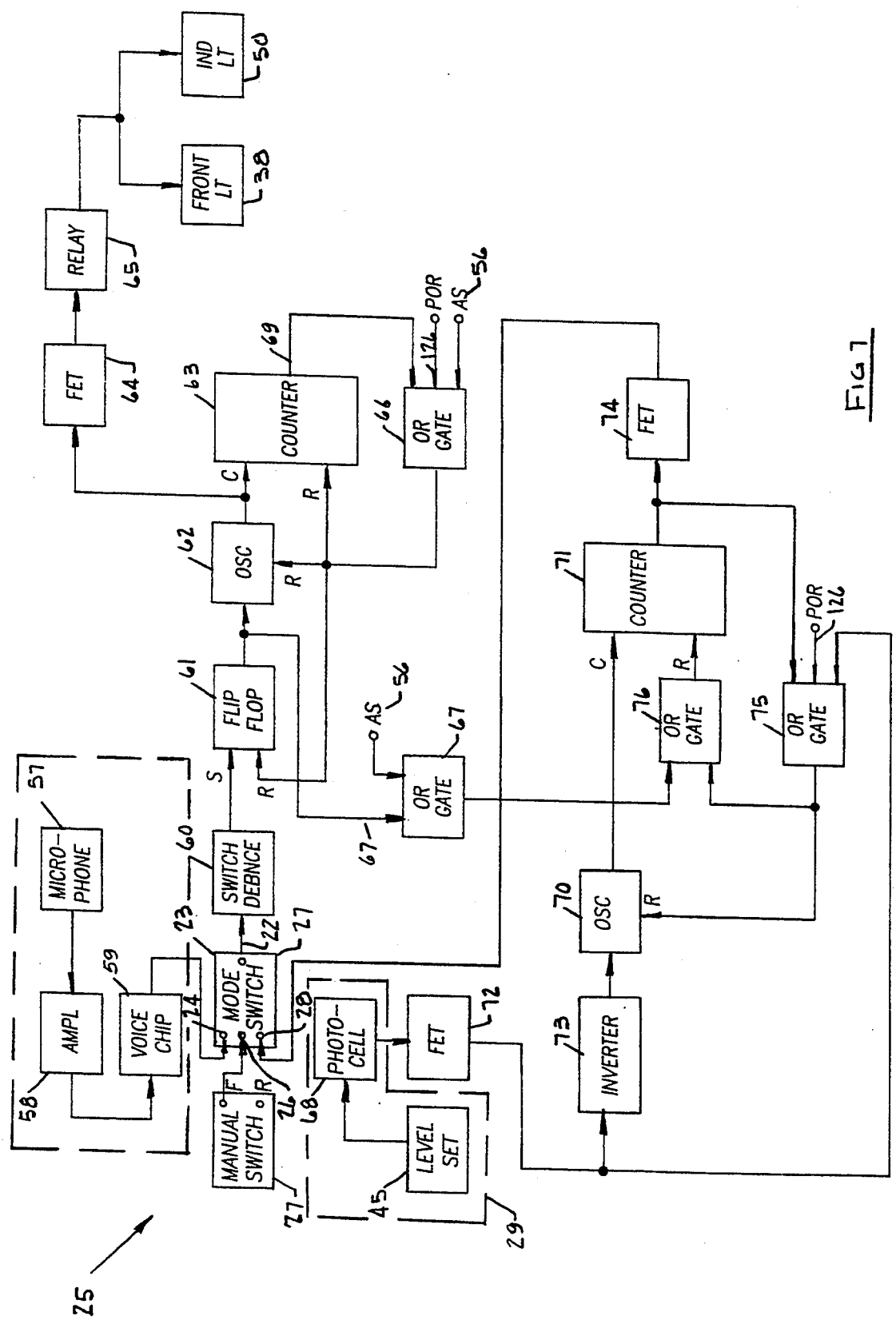
FIG. 7 is a block diagram of the front light signal subsystem.

Referring now to FIG. 7, the front light subsystem is comprised of a microphone 57, an amplifier 58, and a voice recognition chip 59. In describing voice operation of the front light subsystem, it is assumed that selector switch 23 is in voice position 24. When a pre-selected word such as "front" is spoken into microphone 57, a voltage is produced and processed through amplifier 58 and voice recognition chip 59 to produce a low at the output of voice recognition chip 59. The output of voice recognition chip 59 is applied to a switch debounce (SWDBN) 60 causing the output 60 to go high. The high output of SWDBN 60 causes a set pulse to be put into a flip-flop (FF) 61. The output of FF 61 goes from low to high and latches. This turns on oscillator (OSC) 62 and OSC 62 starts pulsing "high" and "low" at the rate of approximately 2 HZ. The output of OSC 62 is fed into a counter (CNT) 63, and CNT 63 counts each of the positive going pulses until it reaches a certain count and the output 69 goes high. The output from OSC 62 is also fed into a field effect transistor (FET) 64, through a relay (RLY) 65 and out to front signal light 38 and indicator light 50. Thus, OSC 62 is pulsing these lights at exactly the same frequency and at the same time as counter 63 is counting.

When CNT 63 has reached a preset number of counts, its output 69 goes high. The high output of CNT 63 is fed into an OR gate 66 whose output goes high to reset CNT 63 via a reset line (R-line) to reset OSC 62 and reset FF 61. At this point, since the FF 61 has been reset and its output is low, OSC 62 is not oscillating, lights 38 and 50 are not flashing and CNT 63 has been reset to zero count. This terminates the cycle that began when the word "Front" was spoken.

When the FF 61 output went high, it also put a high into an OR gate 67. OR gate 67 effects only automatic (photocell) operation and will be explained during the description of automatic (photocell) operation.

"Manual" operation of the front signal system is initiated by moving switch 23 to the "manual" 26 position and momentarily moving switch 27 to the front position and then releasing switch 27. This causes a ground to be put on SWDBN 60 which activates the front signal light 38 and front indicator light 50, i.e., FF 61 output goes high, OSC 62 output oscillates, lights 38 and 50 flash, CNT 63 counts, etc.

With reference to FIG. 7, automatic operation of the front light 38 is initiated by moving switch 23 to the "AUTO" position 28. The front photocell 68, mounted in the front of the vehicle 19, is a light sensitive device whose resistance is a function of light intensity. The threshold level at which the automatic circuit is activated is set with the potentiometer 45 by the driver; thereby allowing the driver to determine what is excessive incoming light rather than to be dependent upon a fixed level.

The "automatic" photocell circuit 29, unlike the "voice" 25 and "manual" circuits, does not trigger into operation immediately when the photocell 68 is exposed to bright lights. A three-second delay is incorporated to prevent driver annoyance caused by excessive activation of the signal system due to short exposures to bright lights. The operation of the automatic system operation will begin by considering exposure of the photocell 68 to light below the threshold level set by a driver when the system is non-operative.

When this occurs the photocell circuit 68 output is low, the FET 72 has a high output with a low input, inverter 73 has a low output, OSC 70 is not oscillating, counter 71 is not counting and therefore its output is low, FET 74 has a high output, OR gate 75 and 76 have high outputs, OSC 70 and counter 71 have highs on their R (reset) lines and the output of OR gate 67 is low.

When bright light above the threshold level strikes the photocell 68, the output of FET 72 goes low, the output from INV 73 goes high, OSC 70 begins to oscillate, the output of OSC 70 is fed into CNT 71 via a clock line C, and CNT 71 starts counting. When CNT 71 has counted approximately three seconds, its output goes high. CNT 71 output is fed into a FET 74 and an OR gate 75 at the same time. The output at FET 74 goes low which feeds a low signal to the SWDBN circuit 60. The SWDBN circuit 60 output goes high setting FF 61, FF 61 output goes high and OR gate 67 output goes high. The input to OR gate 76 goes high, the output of OR gate 76 goes high and the R-line at CNT 71 goes high which resets it, turning off its output. CNT 71 is shut off until such time as the circuitry that is operating the front signal light 38 has completed its operation and has reset FF 61 so that its output goes low. At the time FF 61 output goes low, it releases CNT 71. At this point, CNT 71 starts counting again for three seconds if photocell 68 is still exposed to bright light above the preset threshold level. At the end of three seconds, the front signal light 38 begins to again flash.

In summary, the automatic mode 29 begins when bright light above a threshold set by a driver impinges on photocell 68. After three seconds of continuous exposure above the threshold level, the output at CNT 71 goes high setting off flashing of the front signal light 38 to request a driver of an oncoming vehicle to dim his vehicle's bright lights. After the output of CNT 71 has gone high and the flashing of the front signal light 38 has started, the photocell circuit 29 is inoperative until flashing of front signal light 38 has terminated. Thus, flashing of front signal light 38 must continue for two seconds after being set off by the photocell 68.

If photocell 68 is continuously exposed to bright lights above the threshold level for three seconds after flashing of signal light 38 has terminated, signal light 38 will automatically begin flashing and will flash for two seconds to further request that the bright lights be dimmed. The photocell mode 29 will continue as long as the above conditions exist.

It should be noted that when the front light subsystem is in the automatic mode 29, there will be a minimum three-second delay each time flashing of the front signal light 38 is initiated. It should also be noted that the three-second minimum delay is due to the condition that the photocell 68 must be exposed to bright light above the threshold level for three seconds for CNT 71 to go high and set off flashing of the front signal light 38. After a driver has dimmed his vehicle's bright lights, the exposure of photocell 68 to light will fall below the threshold level, the output of photocell 68 will be low, and the output of FET 72 will go high, the INV 73 output will be low, OSC 70 and CNT 71 will be inoperative, thereby automatically cancelling operation of the front signal light 38.

Figure 8:
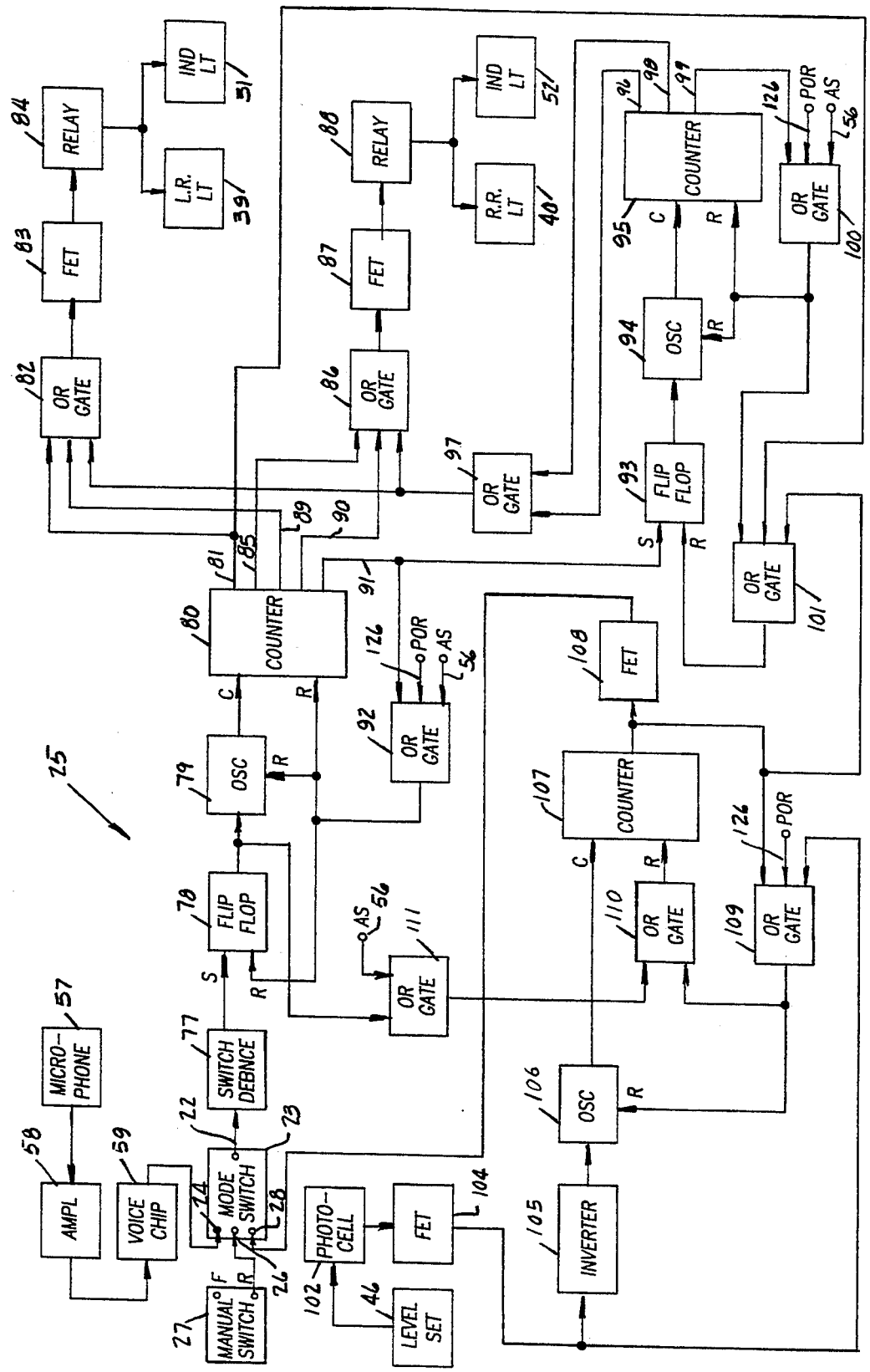
FIG. 8 is a block diagram of the rear light signal subsystem of the first embodiment.

The rear signal light subsystem is shown in block diagram form in FIG. 8 and is similar to the front signal light except for two rear lights 39 and 40 instead of one and a "thank you" message which necessitate additional circuitry. The "thank you" message is transmitted at the end of a certain time period if a rearward approaching car has dimmed its lights. The "thank you" is flashed after a five-second delay. There is also a circuit that automatically prevents the "thank you" message if the bright headlights have not been dimmed.

It should be noted that the operation of the front and rear signal subsystems is exactly the same when initiated by a spoken word such as "rear" or a momentary closing and releasing of the manual F-R switch 27. Therefore, it is only necessary to understand the operation of the voice mode 25 or manual mode 27.

When the manual switch 27 is momentarily moved to "R" position and released, a ground is placed on the input of a SWDBN circuit 77 causing its output to go high. The high output sets FF 78, starts OSC 79 oscillating and starts a CNT 80 counting. Counter 80 has four outputs that go to signal lights 39 and 40.

Each rear signal light 39, 40 flashes two times when the rear signal lights 39, 40 are activated. Although the lights flash two times, it should be understood that the number of flashes of left rear 39 and right rear 40 signal lights can be any number chosen by the designer. The alternate flashing of lights 39, 40 is controlled by output lines 81, 85, 89 and 90 of CTN 80. The output lines 81, 85, 89 and 90 cause the left side light 39 to go "on" and "off" and then the right side light 40 to go "on" and "off" at a frequency of 2 Hz. OR gates 82, 86 separate the outputs of CTN 80, FET 83, 87 operates relays 84, 88 and relays 84, 88 supply voltage to signal lights 39, 40 and indicator lights 51, 52. The fifth output line 91 at the bottom of CNT 80 resets the rear signal subsystem after flashing of signal lights 39, 40 and indicator lights has terminated at which time the output on line 91 goes high. When it goes high, it puts a high into OR gate 92 causing the output of OR gate 92 to go high and reset CNT 80, OSC 79, and FF 78.

The high on the fifth output line 91 of CNT 80 also sets FF 93. When the set pulse is received on FF 93, OSC 94 begins oscillating and CNT 95 begins counting. This produces the five-second delay prior to a "thank you" message. If flashing of signal lights 39, 40 is not reinitiated before approximately five seconds, the first output line 96 of CNT 95 will go high. This puts a high into OR gate 97 causing a high output at OR gate 97. The output from OR gate 97 causes the outputs of OR gate 86 and OR gate 82 to go high at the same time. This causes the left rear 39 and right rear 40 lights and the corresponding indicator lights 51 and 52 to flash at the same time.

Counter 95 functions in a similar way to counter 80, i.e., output 96 goes high and then low, output 98 goes high and then low. This action causes the output of OR gate 97 to concurrently flash lights 39 and 40 twice. A third output from CNT 95 labeled 99 which occurs after both lights have flashed twice causes a high into OR gate 100. The high input of OR gate 100 resets CNT 95 to zero count, resets OSC 94 and through 0R gate 101 resets FF 93.

In summary, the operation of the rear signal lights 39, 40 is as follows. When the F–R switch 27 is momentarily closed and released in the "R" position, the left rear lights alternately flash two times each. If F–R switch 27 is not again closed and released, after five seconds of time delay, both lights 39, 40 concurrently flash to automatically transmit a "thank you" message. If a driver does not want to transmit the "thank you" message, it can be avoided by momentarily closing and releasing switch 27 within the five second time delay. By closing switch 27 within the five second time delay, the operation of the rear light subsystem is reinitiated and the "thank you" message is avoided.

The high output on line 81 of CNT 80 is also connected to the input of OR gate 101 and resets FF 93 if signalling is reinitiated within the five second time delay. This is required to stop CNT 95 from counting five seconds and then displaying the "thank you" message.

In summary, the operation of the rear signal subsystem in the voice mode or in the manual mode causes the rear signal lights 39, 40 to alternately flash. After the termination of the alternate flashing, at the end of five seconds, the rear lights 39, 40 concurrently flash a "thank you" message. A five second delay was chosen to provide sufficient time to reinitiate operation of the system without transmitting the "thank you" message. It should be noted that the five second delay is greater than the three second delay of the rear photocell circuit to prevent transmission of the "thank you" message in the automatic mode if a driver has not dimmed his vehicle's bright lights.

Similar components are used for the automatic mode of the rear signal subsystem and the automatic mode of the front signal sybsystem except for the additional component of the "thank you" message circuit previously described. The interconnections are also the same except that the output from CNT 107 also goes to OR gate 101. The reason for this will be explained later.

Since the automatic mode of operation has been described for the front light subsystem with reference to FIG. 7, and the automatic mode for the rear light subsystem are the same except for the "thank you" message feature, it is only necessary to describe the operation of the "thank you" message feature of the automatic rear signal subsystem.

If a driver dims his lights either during the flashing of the rear lights 39, 40 or during the three-second time delay which occurs after the flashing, the "thank you" message will occur. This happens because when the output line 91 of counter 80 goes high, it both terminates the flashing of the rear lights and sets flip flop 93 initiating the five-second time delay performed by OSC 94 and counter 95. After five seconds, line 96 of counter 95 goes high and the "thank you" message is generated.

If a driver does not dim his lights during the three-second delay which occurs after the flashing of the rear lights 39, 40, the "thank you" message will not occur.

This happens because the output line 91 of CNT 80 goes high, the output of FF 93 goes high and OSC 94 begins oscillating. This starts CNT 95 in anticipation of the flashing of the "thank you" message. If light striking the photocell 102 is continuously above the threshold level during the three-second delay, the "thank you" message will not occur. This happens because if CNT 107 completes its three-second count, CNT 95 stops counting. After the flashing of the rear lights 39, 40 has terminated, output line 91 of CNT 80 sets FF 93 and starts the five-second time delay for the "thank you" message. The high on line 91 also via OR gate 92 resets FF 78, removing the high on the reset line of CNT 107 to allow CNT 107 to begin counting the three-second delay prior to its output going high. It is important to note that three-second and five-second time delays begin essentially at the same time. When CNT 107 completes its three-second count, it resets FF 93 via OR gate 101 thereby terminating the five-second delay which is required for the "thank you" message and reinitiating flashing of rear lights 39 and 40.

Figure 9:
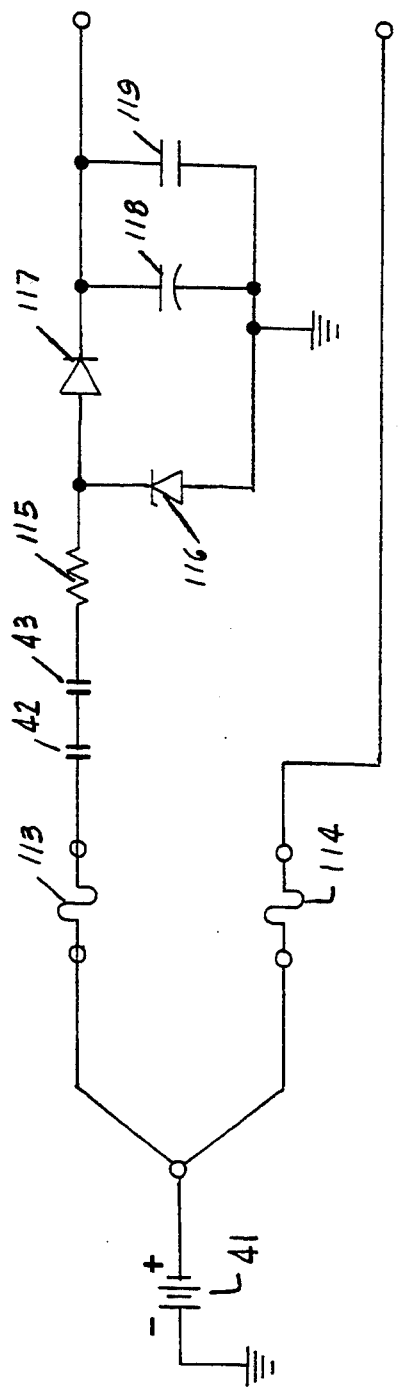
FIG. 9 is a schematic diagram of the power supply subsystem of the vehicle bright light signal system.

Referring now to FIG. 9, the power supply 112 has both the positive and the negative lines connected directly to battery 41. This system supplies current only for the bright light signal system 20. The positive side of battery 41 has two fuses. Fuse 113 is a low amp fuse for the electronic module 21. Fuse 114 is a higher amp fuse for the signal light circuits which supply current through the relay contacts 84, 88 to operate lights 38, 39, 40, 50, 51, and 52.

Resistor 115 is a dropping resistor for Zener diode 116. 117 diode keeps negative spikes out of the signalling system 20. Capacitors 118 and 119 are filter capacitors.

Figure 10:
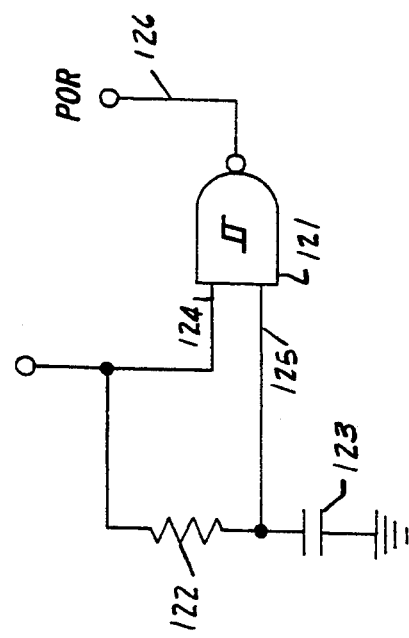
FIG. 10 shows a schematic diagram of a "power on" reset circuit for the vehicle bright light signal system.

The function of the "power on" reset (POR) circuit 120 shown in FIG. 10 is to set all counters, flip-flops, oscillators, and similar devices to predetermined positions when power is turned on. The POR line 126 is connected to various portions of the system. The POR circuit is a requirement of CMOS type logic.

The POR circuit 120 is comprised of a NAND gate 121, a resistor 122 and a capacitor 123. When a positive voltage +V is first applied, input 124 is permanently tied to a plus line and input 125 is tied from the plus line through resistor 122 to condensor 123. When power is supplied to NAND gate 121, capacitor 123 begins charging. During the charging of capacitor 123, the output of NAND gate 121 goes high and remains high until the transfer point of NAND gate 121 is reached at which time its output goes low and remains low as long as power is applied.

Figure 11:
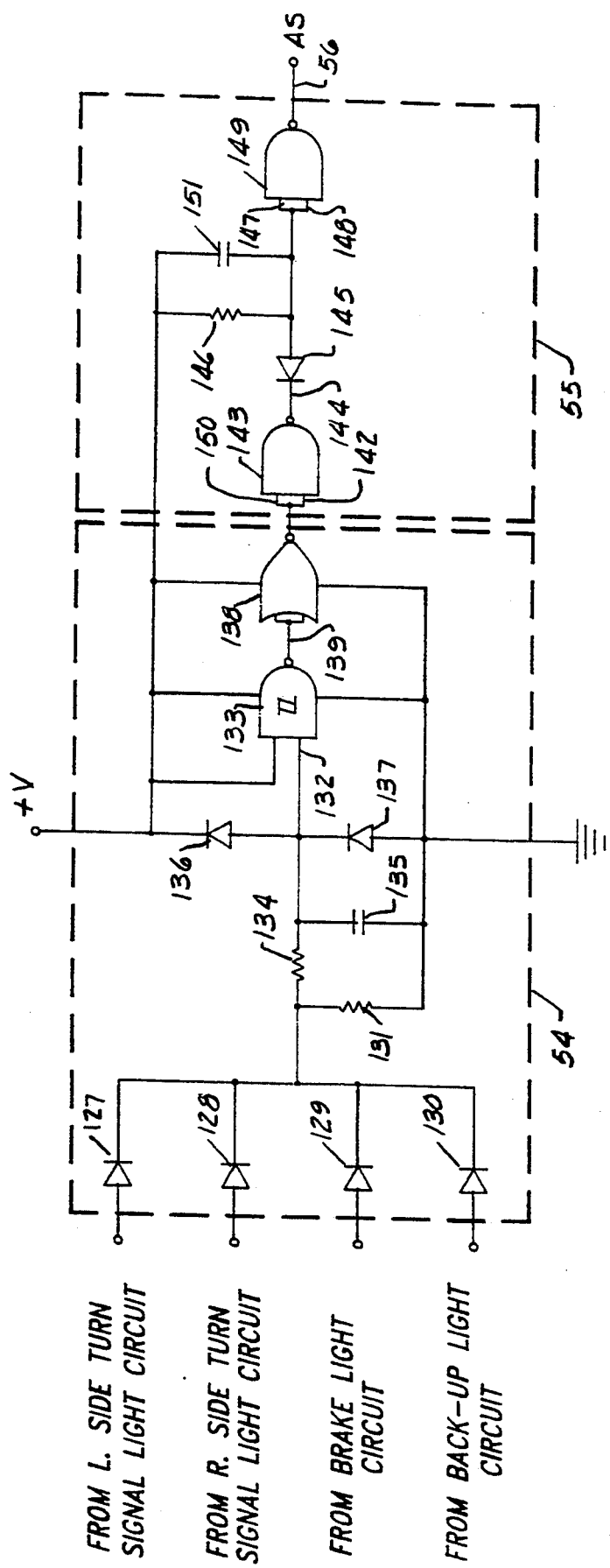
FIG. 11 is a schematic diagram of the abort subsystem.
Figure 12:
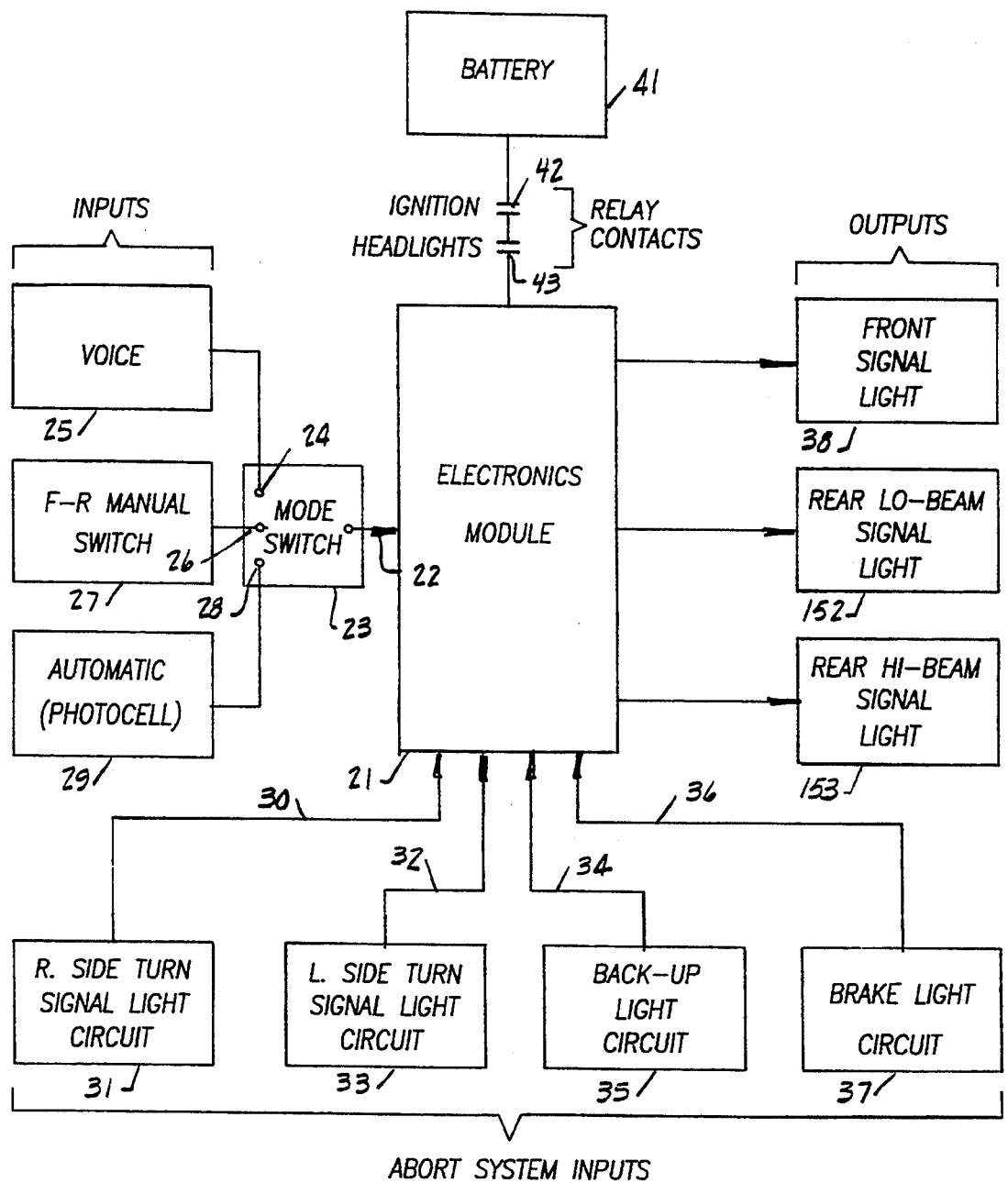
FIG. 12 is a block diagram of a second embodiment of the vehicle bright light signal system.

The abort subsystem (AS), comprised of a noise reduction circuit 54 and demodulator circuit 55, is shown in schematic form in FIG. 11. As previously mentioned, the AS prevents operation of the signal lights 38, 39 and 40 if the turn signal lights, brake lights or back-up lights are on. The input side of AS is connected to the noise reduction system shown in FIG. 11.

The purpose of the four diodes, 127, 128, 129 and 130, of AS 53 is to limit inputs to AS 53 to positive signals. Therefore, they act as decoupling devices and prevent other circuits from affecting the bright light signal system 20. The output of the four diodes 127, 128, 129 and 130 is fed to a filter network comprised of resistor 134 and capacitor 135. It is the function of resistor 131 to tie down line 132 of NAND gate 133 when the inputs from diodes 127, 128, 129 and 130 are inactive.

The diodes 136 and 137 are clamping devices to assure that noise can never go above the +V line or below the ground line, an unacceptable state for CMOS devices. Since the output of NAND gate 133 is high with a low input on line 132, a NOR gate 138 which is used as an inverter is necessary to assure that the AS line 56 is low with no input signal. Diodes 127, 128, 129 and 130, resistors 131, 134, capacitor 135, diodes 136, 137, and gates 133, 138 constitute the noise reduction circuit 54.

The output from the noise reduction circuit 54 is fed into a demodulator circuit 55 comprised of gates 143, 149, diode 145, resistor 146 and capacitor 151. The function of the demodulator 55 is to provide a steady output with a varying input. This is required because the turn signals pulse "on" and "off".

When the inputs to the demodulator 55 are low, the output of the demodulator 55 will be low. This is so because when the inputs to NAND gate 143 are low, the output of gate 143 will be high, diode 145 is nonconductive, the inputs to NAND gate 149 are high via resistor 146 and the output of NAND 149 gate is low.

When output of NAND gate 144 goes low, diode 145 is polarized low on the cathode and high on the anode. Therefore, capacitor 151 starts charging up to +V through the low on resistance of gate 143. The charging action of capacitor 151 through diode 145 causes inputs 147 and 148 to be low and if inputs 147 and 148 are low, the output 56 of gate 149 is high. All of the time that the signal is high, capacitor 151 continues to charge. When the input signal goes low, capacitor 151 begins to discharge through resistor 146 but before it can discharge through R146 to remove the low from inputs 147 and 148, the next incoming signal causes capacitor 151 to begin to charge again. Therefore, the bottom of capacitor 151 continues to stay low because the resistance of R146 is high enough to keep the voltage at the bottom of capacitor 151 always in a low position, therefore guaranteeing a high output at 56. As long as the turn signal is on, C151 and the associated circuitry keep output of gate 149, the AS line 56, high.

The function of the AS line 56 is to terminate the operation of the front and rear signal subsystems regardless of where they may be in their sequence of operation and to reset the systems to a "begin operations" status. If the mode switch was in the voice or manual positions these systems will remain inoperative until reinstated by the driver. If the mode switch was in the auto mode reinititation would occur as soon as the AS went low and the designated system would flash the previously chosen lights after a three-second delay. Referring now to FIG. 7, the AS line is shown as an input to OR gate 67. This results in a high being on the reset terminal of counter 71, causing its output to be low, resetting it to zero count and thereby aborting its operation if the automatic mode had been chosen. Also, the AS line is shown as an input to OR gate 66. The output of OR gate 66 would have the same effect as the previously described example of OR gate 67 if the voice or auto modes were pre-chosen. The abort subsystem line 56 for the rear light system is shown in FIG. 8.

Figure 15:
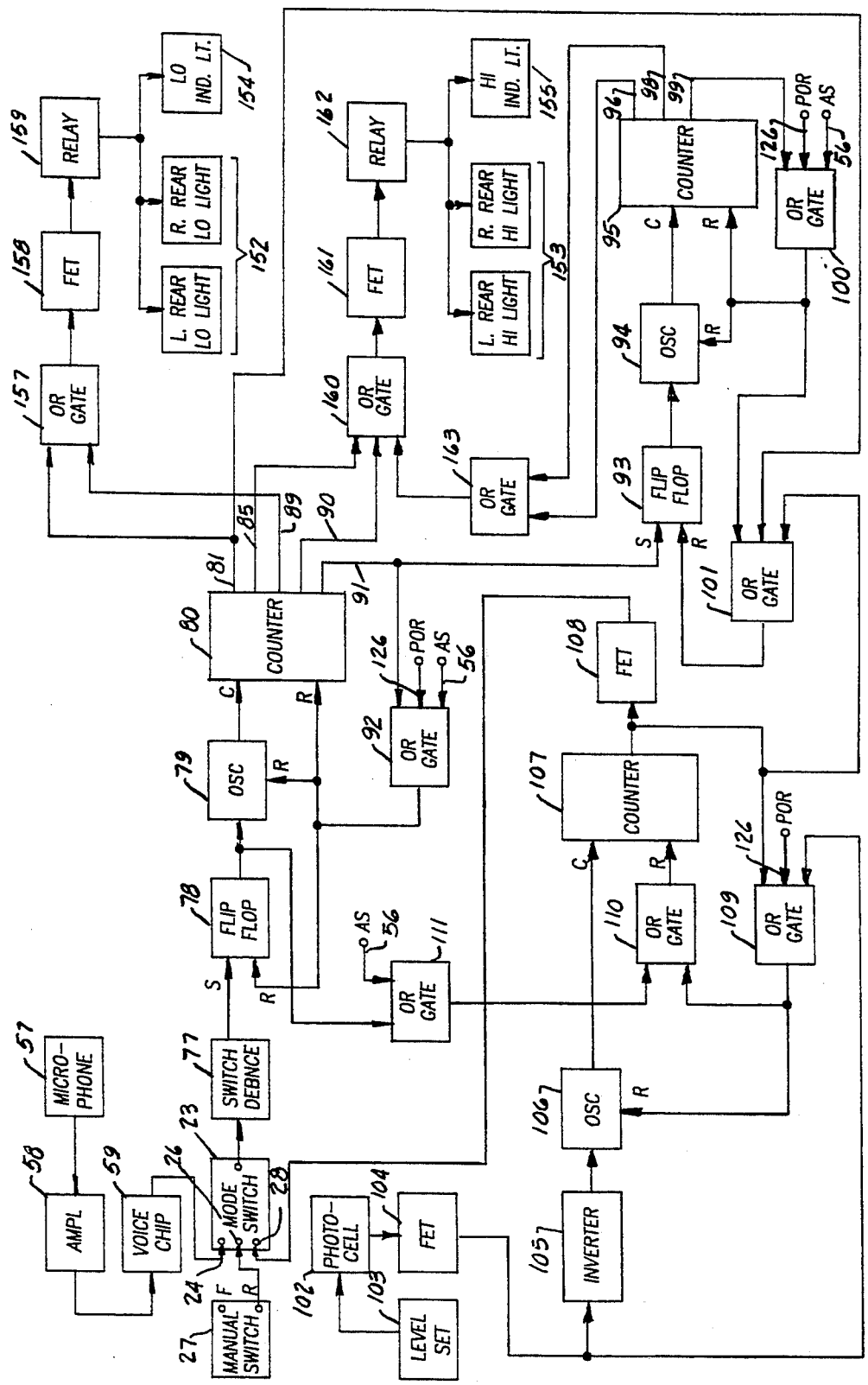
FIG. 15 is a block diagram of the rear signal light system of the second embodiment.

Referring now to FIG. 15, a block diagram is shown for a second embodiment of the invention which is similar to the earlier described embodiment except that the rear signal lights 152, 153 concurrently flash "on" and "off" to signal vehicles approaching from the rear. The rear signal lights 152, 153 are comprised of dual, high and low intensity filament lamps or in the alternative pairs of single filament high and low intensity lamps. In the second embodiment the first 81 and third 89 output lines of CNTR 80 operate the two low beam rear signal 152 and indicator light 154 and the second and fourth output lines of CNTR 80 operate the two rear high beam signal 15 and indicator lights 155.

Figure 13:
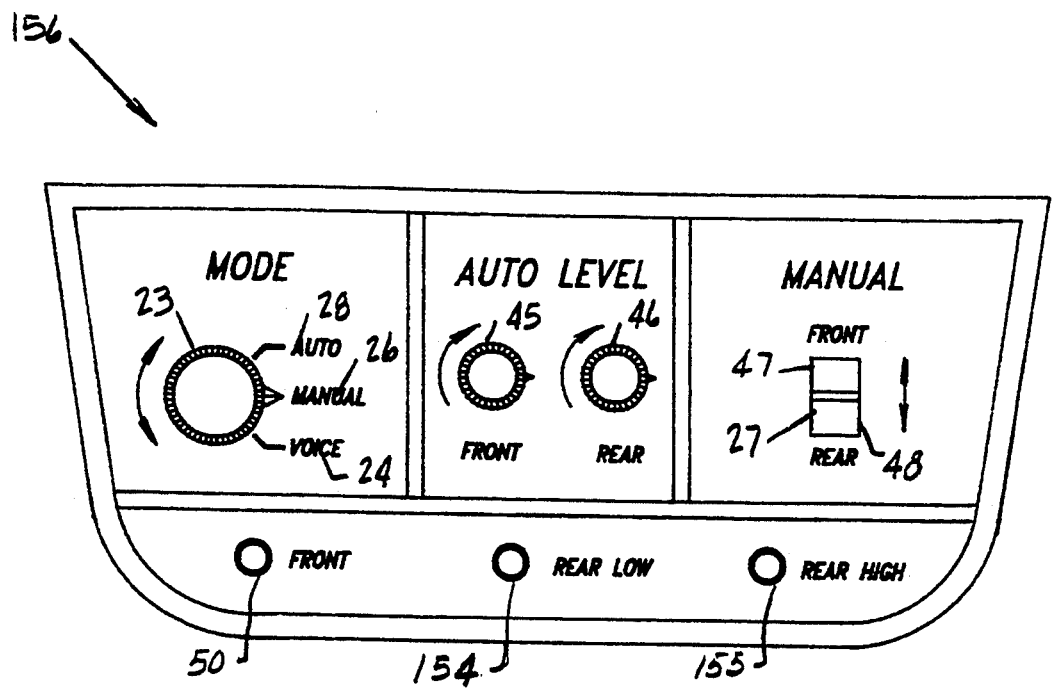
FIG. 13 is a front view of a control panel for operating the second embodiment of the vehicle bright light signal system.
Figure 16:
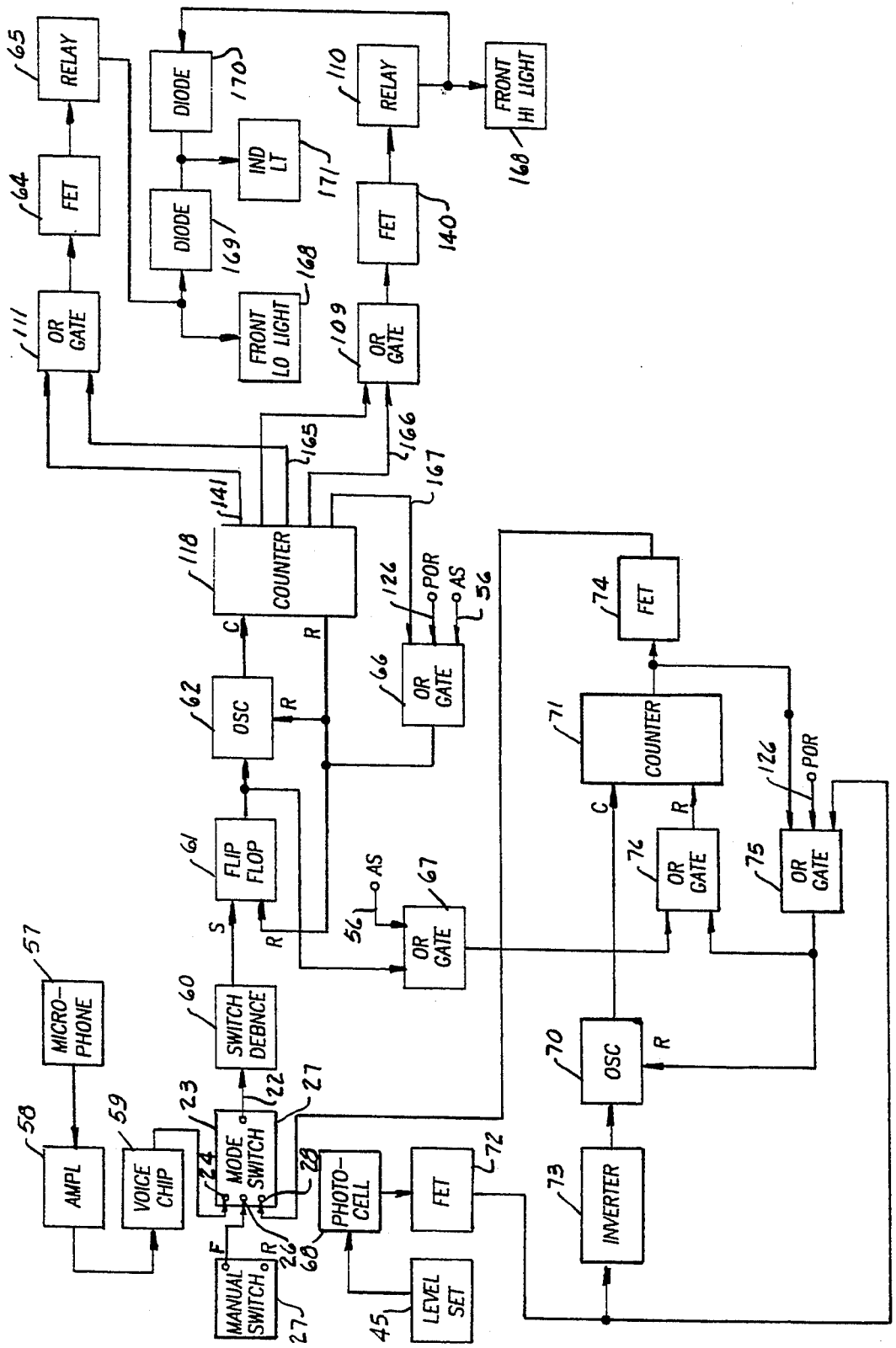
FIG. 16 is a block diagram of the front signal light system of the third embodiment.

The rear high beam lights 153 flash to transmit the "thank you" message. The control panel 156 for the second embodiment is shown in FIG. 13. The control panel 156 is the same as for the first embodiment except for the rear indicator lights 154, 155. The front light subsystem of the third embodiment is shown in FIG. 16 and has a single dual high intensity and low intensity filament light mounted in a forward portion of the vehicle's external side mounted rear view mirror. When the front light subsystem of the third embodiment is activated, the dual filament light 168 flashes first "low" and then "high" at a frequency of 2 Hz for two seconds. Otherwise the operation of the front light subsystem is the same as the first embodiment.

Referring now to FIG. 15, operation of the rear subsystem in all three of its modes—voice, manual and automatic (photocell)—is the same as was previously described for the rear light subsystem shown in FIG. 8, except for the following.

As soon as CNT 80 begins counting, it has a first output 81 going to the rear low intensity signal lights 152, then an output signal going to the rear high intensity signal lights 153. The rear low intensity lights 152 flash, being set off from a first output 81, through an OR gate 157, an FET 158, and a RLY 159. Indicator light 154 flashes concurrently. Then there is a pause; then a second output 85 on CNT 80 flashes rear high intensity lights 153 through an OR gate 160, an FET 161, a RLY 162 which also operates indicator light 155; then rear low intensity lights 152 from an output 89, rear high intensity lights 153 from an output 90, etc.

The fifth line shown on the bottom of CNT 80 is an output 91 that resets the subsystem similarly to the subsystem shown in FIG. 8. So, after each of the lights 152 and 153 have flashed two times, last output 91 on counter 80 goes high. When it goes high, it puts a high into an OR gate 92 and a high out of OR gate 92 resets CNT 80, OSC 79, and FF 78.

Also in forming the "thank you" message, for the second embodiment in FIG. 15, the circuitry representing the five second delay prior to the "thank you" message and comprising FF 93 which is set from fifth output 91 of CNT 80, OSC 94 controlled by FF 93, and CNT 95 operated by OSC 94 are similar to that in FIG. 8.

In approximately five seconds of time after CNT 95 has started counting, a first output 96 from CNT 95 goes high. This puts the high into an OR gate 163, the output from OR gate 163 causes output of OR gate 160 to go high. Therefore, the high intensity rear signal lights 153 flash, and corresponding indicator light 155 follows it.

The next output down on CNT 95, namely an output 98, does exactly the same. Again, as it was with outputs of CNT 80, outputs from CNT 95 are effected in such a way that CNT 95 has an on time and an off time; so that the two outputs from CNT 95 have a time in between the flashes so that the "thank you" message consists of a flash of high intensity rear signal lights 153, an off time, a second flash of the lights, and a permanent off time. A third output from CNT 95 labeled 99 which occurs after high intensity lights 153 have flashed twice causes a high into an OR gate 100. This high input into OR gate 100 causes a high output thereby resetting CNT 95, OSC 94 and running through an OR gate 101 to reset FF 93.

Figure 14:
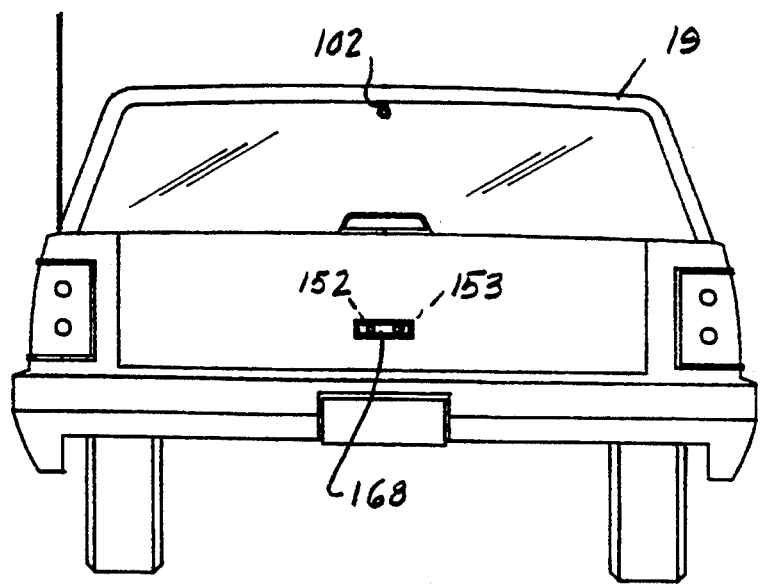
FIG. 14 is a rear view of a vehicle showing the rear signalling light of the third embodiment.
Figure 17:
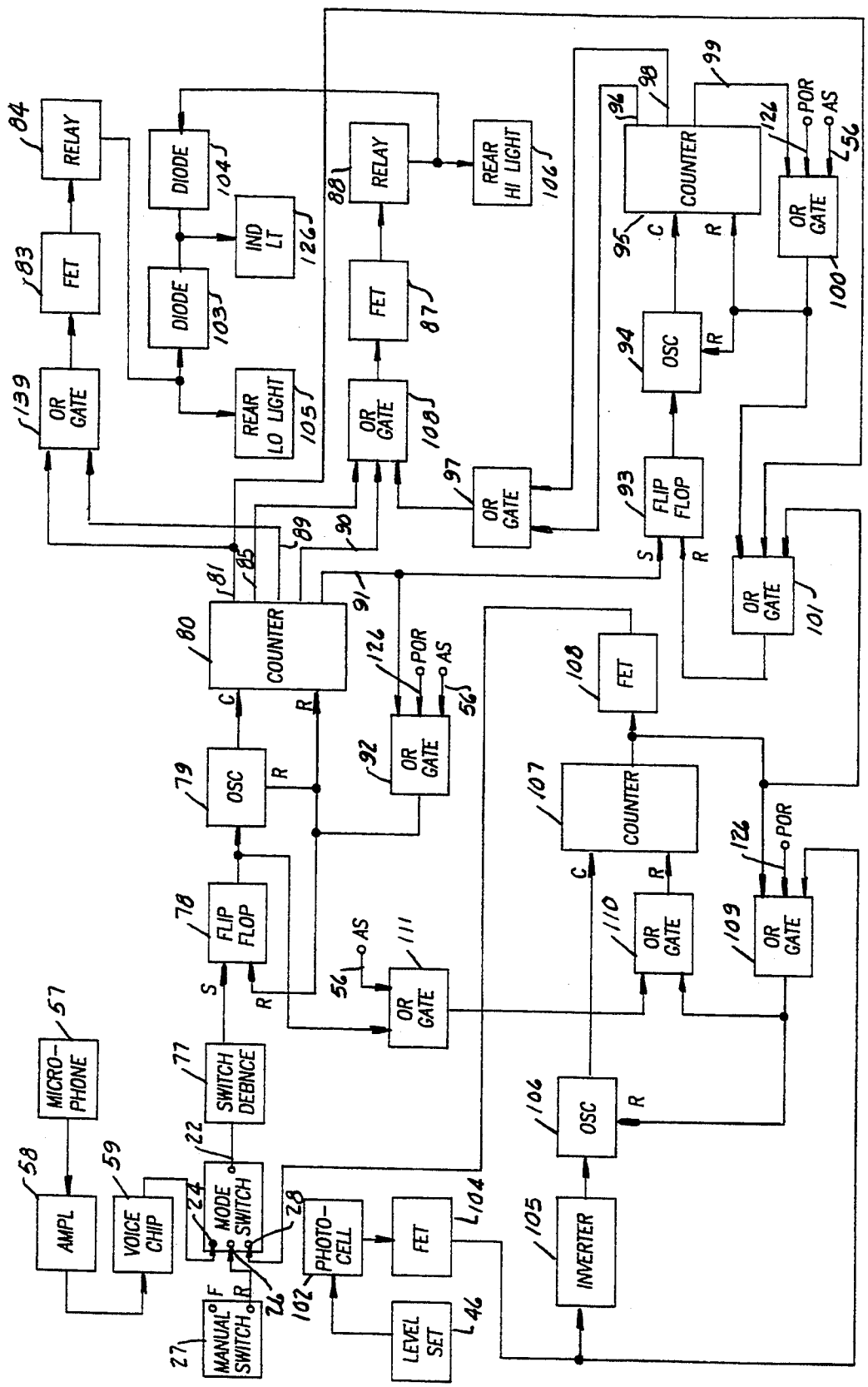
FIG. 17 is a block diagram of the rear signal light of the third embodiment.

Referring now to FIGS. 14 and 17, a third embodiment is shown which is similar to the second embodiment except that a single signal light 168 is provided in the rear signal light system rather than two signal lights. The single signal light is a dual filament, high intensity, low intensity light mounted in the center of the rear of vehicle 19 which first flashes low intensity and then flashes high intensity at the frequency of 2 Hz for two seconds.

Diodes 103 and 104 allow the use of a single indicating light 126 in a control panel (not shown) to inform a driver that the single rear signal light 168 is flashing.

While this invention has been described in conjunction with specific embodiments, it should be apparent to those skilled in the art that many alternatives, modifications, and variations are possible without departing from the spirit thereof. Accordingly, it is intended to embrace all alternatives, modifications, and variations as may fall within the spirit and broad scope of the claims which are appended hereto.

I claim:

1. A hands free vehicle bright light signal system for transmitting a signal to a driver of another vehicle to request the driver to dim his vehicle's bright headlights, comprising in combination: at least one signal light mounted on the exterior of a first vehicle for transmitting a signal to said driver of another vehicle to request said driver of another vehicle to dim his vehicle's bright headlights; and a control system for activating said signal light of said first vehicle, said control system including a means for initiating operation of said signal light without the hands of a driver of said first vehicle and a means for permitting said driver of said first vehicle to establish a threshold level for activating said signal light of said first vehicle.

2. The hands free vehicle bright light signal system recited in claim 1 wherein said signal light is mounted on the front of the exterior of said first vehicle to request a driver of an oncoming vehicle to dim his vehicle's bright headlights.

3. The hands free vehicle bright light signal system recited in claim 2 further comprising a pair of signal lights mounted on the rear of the exterior of said first vehicle to request a driver of a vehicle approaching from the rear to dim his vehicle's bright headlights.

4. The hands free signal system recited in claim 3 wherein said pair of signal lights mounted on said rear of said vehicle have a first operating mode wherein each of said pair of signal lights have a high intensity filament and a low intensity filament and said signal lights first concurrently flash said low intensity filament and then concurrently flash said high intensity filament to request said driver of said vehicle approaching from the rear to dim his vehicle's bright headlights.

5. The hands free vehicle bright light signal system recited in claim 3 further comprising said first vehicle having a pair of back-up lights mounted in housing on the rear of said first vehicle and said pair of signal lights mounted in the same housings as said back-up lights.

6. The hands free signal system recited in claim 5 wherein said pair of signal lights mounted on the rear of said first vehicle have a first operating mode wherein said lights alternately flash on and off to request said driver to dim his vehicle's bright headlights and a second operating mode wherein said signal lights concurrently flash on and off to transmit a thank you message if said driver dims his vehicle's bright headlights.

7. The hands free signal system recited in claim 5 wherein said signal lights request said driver to dim his vehicle's bright headlights when activated by said hands free system by flashing on and off at a frequency of 2 Hz for two seconds.

8. The hands free signal system recited in claim 7 wherein said signal lights automatically concurrently flash on and off to transmit a thank you message if said driver of another vehicle dims his vehicle's bright headlights.

9. The hands free signal system recited in claim 1 wherein said means for initiating operation of said signal light without the hands of said driver of said first vehicle is responsive to a spoken word and comprises a microphone for producing a waveform in response to said spoken word and an electronic means for processing the output of said microphone to activate said signal light of said first vehicle.

10. The hands free signal system recited in claim 1 wherein said means for initiating operation of said signal light without the hands of said driver of said first vehicle comprises a photocell which is responsive to the bright headlights of another vehicle and a first electronic means for processing the output of said photocell to activate said signal light.

11. The hands free signal system recited in claim 10 further comprising a second electronic means for delaying activation of said signal light when said photocell is exposed to a bright vehicle headlight.

12. The hands free signal system recited in claim 1 further comprising a three position spring loaded center off switch for manually activating said signal light.

13. The hands free signal system recited in claim 1 further comprising said first vehicle having front and rear turn signal lights, brake lights and back-up lights and said control light deactivates said signal system if either said turn signal lights, brake lights or back-up lights are energized.

14. A hands free vehicle bright light signal system for transmitting a signal to a driver of another vehicle to request the driver to dim his vehicle's bright headlights, comprising in combination: a front signalling light mounted in the forward portion of an external side mounted rear view mirror of a first vehicle for transmitting said signal to a driver of a second oncoming vehicle to request said driver of said second oncoming vehicle to dim his vehicle's bright headlights; a pair of rear signalling lights mounted in the rear of said first vehicle for requesting a driver of a third vehicle approaching said first vehicle from the rear to dim said third vehicle's bright headlights; and a control system for hands free activation of said front and rear signalling lights, said control system having a hands free means for flashing said front signalling light "on" and "off" to signal said driver of said second oncoming vehicle to dim his vehicle's bright headlights, means for alternately flashing said pair of rear lights "on" and "off" to signal said driver of said third vehicle approaching from the rear to dim his vehicle's bright headlights, a means for permitting said driver of said first vehicle to establish a threshold level for hands free activating said pair of rear signalling lights of said first vehicle; and a means for concurrently flashing said pair of rear lights on and off to thank said driver of said third vehicle if said driver dims his vehicle's bright headlights.

15. The hands free signal system recited in claim 14 further comprising said control system having a first photocell mounted in the front of said first vehicle for automatically activating said front signalling light when said photocell is exposed to said second oncoming vehicle's bright headlights and a second photocell mounted in the rear of said first vehicle for automatically activating said pair of rear signal lights when said second photocell is exposed to said third vehicle's bright headlights.

16. The hands free signal system recited in claim 15 further comprising said control system having means for prohibiting operation of said front or said rear signalling lights if the intensity of light to which said photocell is exposed is below a preset level for responding to said second and third vehicle's bright lights.

17. The hands free signal system recited in claim 15 further comprising said control system having means for automatically terminating operation of said front and rear signalling lights after a short interval of time and of reinitiating operation of said front and said rear signalling lights after a short interval of time if the intensity of said bright headlights are above a preset threshold level.

18. The hands free signal system recited in claim 17 further comprising said control system having means for automatically prohibiting said thank you message if operation of said front or said rear signalling lights is reinitiated.

19. A hands free vehicle bright light signal system for transmitting a signal to a driver of another vehicle to request the driver to dim his vehicle's bright headlights, comprising in combination: a front signalling light mounted in the forward portion of an external side mounted rear view mirror of a first vehicle for transmitting said signal to a second oncoming vehicle to request the driver of said second oncoming vehicle to dim his vehicle's bright headlights; a rear signalling light mounted in the rear of said first vehicle for requesting a driver of a third vehicle approaching said first vehicle from the rear to dim said third vehicle's bright headlights; and a control system for hands free activation of said front and rear signalling lights, said control system having a hands free means for flashing said front signalling light on and off to signal said driver of said second oncoming vehicle to dim his vehicle's bright headlights, said hands free means comprising a voice activated control system, said voice control system comprising a microphone for producing a voltage waveform which varies in accordance with spoken words and an electronic means for processing the output of said microphone to activate said front and said rear signalling lights and a means for permitting said driver of said first vehicle to establish a threshold level for hands free activating said signal lights of said first vehicle.

20. The hands free signal system recited in claim 19 wherein said rear signal light comprising a dual high intensity filament, low intensity filament light, said rear signal light when activated by said bright headlights of said third vehicle alternately flashing said low intensity and said high intensity filaments.

21. The hands free signal system recited in claim 20 wherein said front signalling light comprising a dual high intensity filament, a low intensity filament light, said front signal light when activated by said bright headlights of said second vehicle alternately flashing said low intensity filament and said high intensity filaments.

22. The hands free signal system recited in claim 20 further comprising said vehicle having front and rear turn signal lights and said control system having means for deactivating said front and rear signalling lights if front or said rear turn signal lights are energized.

* * * * *